United States Patent [19]

Rhoades

[11] 4,063,415
[45] Dec. 20, 1977

[54] APPARATUS FOR STAGED COMBUSTION IN AIR AUGMENTED ROCKETS

[75] Inventor: Richard G. Rhoades, Huntsville, Ala.

[73] Assignee: The United States of America as represented by the Secretary of the Army, Washington, D.C.

[21] Appl. No.: 267,736

[22] Filed: June 30, 1972

[51] Int. Cl.² ............................................. F02K 3/10
[52] U.S. Cl. .................................... 60/261; 60/270 S
[58] Field of Search ................. 60/225, 270 R, 261, 60/270 S

[56] References Cited

U.S. PATENT DOCUMENTS

| | | | |
|---|---|---|---|
| 2,926,613 | 3/1960 | Fox | 60/253 |
| 3,030,769 | 4/1962 | Badders | 60/270 R |
| 3,279,187 | 10/1966 | Lindman | 60/270 R |

FOREIGN PATENT DOCUMENTS 1,036,205  4/1953  France ........................... 60/270

Primary Examiner—Samuel Feinberg
Attorney, Agent, or Firm—Nathan Edelberg; Robert P. Gibson; Harold W. Hilton

[57] ABSTRACT

Apparatus for providing staged addition of air to the ramburner of an air augmented rocket for enhancing the ignition, combustion, and performance of the rocket. A shaped, strut-mounted, ablative-coated sleeve is mounted coaxially in the ramburner section of the rocket. This sleeve causes the diversion of a part of the inlet air and provides a favorable regime for ignition and combustion of the air augmented propellant. The diverted air is subsequently added to the combustion region through passageways in the sleeve. The shaped combustible ablative material of the sleeve provides additional thrust-producing fuel to the ramburner.

2 Claims, 2 Drawing Figures

U.S. Patent
Dec. 20, 1977
4,063,415
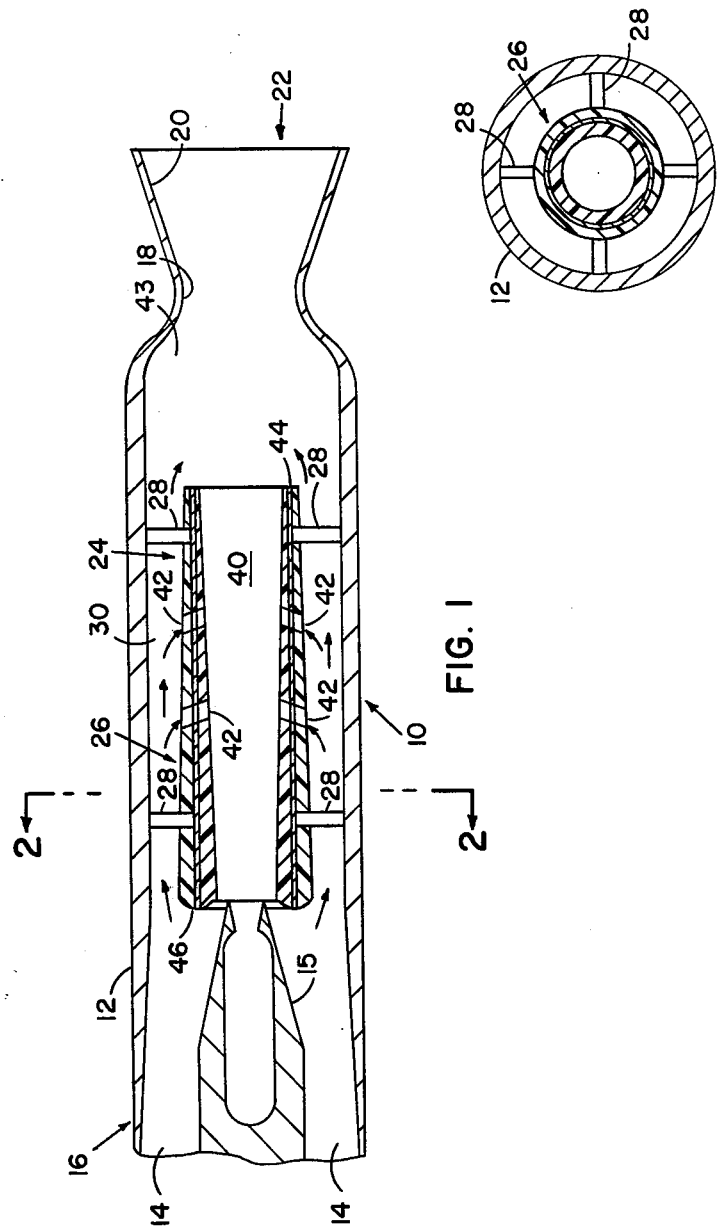

4,063,415

APPARATUS FOR STAGED COMBUSTION IN AIR AUGMENTED ROCKETS

BACKGROUND OF THE INVENTION

Recent analysis has indicated that a promising technique for achieving stable ignition and efficient combustion in air augmented rockets is by "staging" the addition of the inlet air to the ramburner. This "staging" permits high temperature, near stoichiometric, air to propellant (fuel) ratios to be obtained during the entrance and initial regions of the ramburner. These conditions enhance the critical ignition phases of the highly metal loaded and underoxidized propellants used in air augmented systems. The key design problem to be overcome in configuring such "staged" systems is to achieve the "staged" addition of inlet air without introducing excessive losses (due to additional weight, friction, or cost) to the overall system.

SUMMARY OF THE INVENTION

Apparatus for efficiently providing staged addition of air in air augmented rockets. The apparatus includes a metal tapered cylinder coated with an ablative material capable of producing products suitable for further combustion (such as nylon or polyethylene) and positioned in the ramburner body intermediate the fuel generator and the throat of the nozzle of the ramburner. The cylinder is disposed in spaced relation with the interior surface of the ramburner to form an annular chamber therebetween. The interior of the cylinder is a combustion region and sides of the cylinder are provided with apertures which communicate with the interior of the cylinder and the annular chamber. Air inlets are provided at the forward portion of the ramburner to direct air into the ramburner. This air induction system provides air to the interior of the ramburner where the leading edge of the cylinder divides the air into an amount which provides a stoichiometric (or near stoichiometric) condition just inside the leading edge of the cylinder. The rest of the air is directed to the annular chamber to be later added to the combustion region (interior of cylinder) through the apertures in the wall of the cylinder or passed to a mixing chamber intermediate the aft portion of the cylinder and the throat of the nozzle of the ramburner to complete the mixing and combustion process prior to entrance of the throat and nozzle of the ramburner. The ablative material is used to provide additional fuel to the ramburner combustion process, while providing the necessary insulation against the thermal environment.

It is, therefore, an object of the present invention to provide apparatus for efficiently providing staged addition of air to the ramburner of an air augmented rocket.

It is a further object of the invention to provide such apparatus with means for providing additional fuel to the ramburner combustion process.

These and other objects of the present invention will become more readily apparent from the following drawing and description of the invention.

BRIEF DESCRIPTION OF THE DRAWINGS

FIG. 1 is an elevational sectional view of the ramburner utilizing the principals of the present invention.

FIG. 2 is a sectional view taken along line 2—2 of FIG. 1.

DESCRIPTION OF THE PREFERRED EMBODIMENT

As shown in FIG. 1 a ramburner 10 includes a body 12 having air inlets 14 and a fuel generator 15 at the forward portion 16 thereof and a throat 18 and nozzle 20 at the rear portion 22 of body 12.

Staged air apparatus 24 includes a tapered cylinder 26 carried in coaxial, spaced relation with body 12. The cylinder is disposed intermediate gas generator 15 and throat 18. Support struts 28 are utilized to secure cylinder 26 in spaced relation with body 12 to provide a chamber 30 between the cylinder and body. The interior of the cylinder forms a combustion region 40. Cylinder 26 is provided with a plurality of apertures 42 which communicate with chamber 30 and combustion region 40. The apertures are disposed in radial and longitudinal spaced relation in the sides of cylinder 26. A mixing region 43 is provided in body 12 intermediate the aft end 44 of cylinder 12 and throat 18.

In operation, solid fuel generator 15 provides underoxidized combustion products to the combustion region 40. The leading edge 46 of cylinder 26 divides the air into an amount which provides a stoichiometric (or near stoichiometric) condition just inside the cylinder 26, the rest of the air is bypassed to the outside of the staging cylinder 26 (i.e. away from the centerline) to chamber 30. The air is then directed to combustion region 30 through holes 42 provided in cylinder 26. Some of the air also is directed to mixing chamber 43 for completion of the mixing and combustion process prior to entrance to throat 18 and nozzle 20 of the ramburner.

The precise number, sizing, and orientation of the bypass air addition holes 42 in the staging device 26 is a function of flight conditions and fuel generator products and must be determined for each required design; more locations other than those illustrated may be required, they are shown as typical. Additional combustion occurs between the ablative coating on the "staging" device and the bypass air between chamber 30 and mixing chamber 43 also between combustion chamber 40 and mixing chamber 43. Staging device 26 is tapered to permit gradual complete ablation at desired locations (and hence minimum weight addition due to the device) as the air temperature increases. This is permissible since increased air temperature simplifies the ignition problem and makes the staging device less necessary.

Although in the embodiment described a coaxial arrangement of the staging device and the ramburner is illustrated, other configurations may be restored to since the principle remains the same.

I claim:

1. Apparatus for providing staged addition of air to the ramburner of an air augmented rocket comprising:
   a. a ramburner including a combustion region, said ramburner having a forward portion provided with air inlets and an aft portion provided with a nozzle;
   b. an air staging device disposed intermediate said air inlets and said nozzle, said staging device disposed for metering air flow to said combustion chamber for enhancing the ignition combustion and performance of said rocket, said air staging device being a tapered cylindrical member having apertures disposed in radial and longitudinal spaced relation in the surface thereof for directing a portion of said air to said combustion chamber, said staging device further having a coating of ablative material thereon for providing additional thrust producing fuel to the ramburner as well as providing thermal protection; and, c. a mixing chamber disposed intermediate said nozzle and said cylindrical member to receive air passing around said staging device for mixing with the combustion products issued from said combustion region.

2. Apparatus as in claim 1 wherein said cylindrical staging device is disposed in coaxial spaced relation with the inner surface of said ramburner to form an annular chamber therebetween said combustion region being disposed in the interior of said cylindrical staging device and said apertures communicating with said annular chamber and said combustion region for directing air thereto from said annular chamber, additional air flow being directed into the forward portion of said cylindrical staging device to said combustion chamber and around said cylindrical device to said mixing chamber.

* * * * *